United States Patent
Zhu et al.

(10) Patent No.: US 9,362,768 B2
(45) Date of Patent: Jun. 7, 2016

(54) CHARGER AND CHARGING SYSTEM

(71) Applicant: Huawei Device Co., Ltd., Shenzhen (CN)

(72) Inventors: Xiongwei Zhu, Shenzhen (CN); Konggang Wei, Shenzhen (CN); Zufeng Guo, Chengdu (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/464,899

(22) Filed: Aug. 21, 2014

(65) Prior Publication Data
US 2014/0361733 A1 Dec. 11, 2014

Related U.S. Application Data

(63) Continuation of application No. PCT/CN2013/078261, filed on Jun. 28, 2013.

(30) Foreign Application Priority Data

Jun. 28, 2012 (CN) ...................... 2012 2 0308669 U

(51) Int. Cl.
H02J 7/00 (2006.01)
H02J 7/04 (2006.01)
(Continued)

(52) U.S. Cl.
CPC ......... *H02J 7/0052* (2013.01); *H02M 3/33507* (2013.01); *H02M 3/33569* (2013.01);
(Continued)

(58) Field of Classification Search
CPC ............................. H02J 7/0006; H02J 7/0052
USPC .......................................... 320/141, 145, 137
See application file for complete search history.

(56) References Cited

U.S. PATENT DOCUMENTS

| 8,169,184 B2 * | 5/2012 | Li ......................... H02J 7/0018 320/106 |
| 2010/0085022 A1 * | 4/2010 | Shimizu ................ H02J 7/0004 320/162 |
| 2012/0293135 A1 | 11/2012 | Fan et al. |

FOREIGN PATENT DOCUMENTS

| CN | 1738148 A | 2/2006 |
| CN | 101917032 A | 12/2010 |

(Continued)

OTHER PUBLICATIONS

Partial English Translation and Abstract of Japanese Patent Application No. JP2008187790A, Mar. 11, 2015, 23 pages.

(Continued)

*Primary Examiner* — Edward Tso
*Assistant Examiner* — Ahmed Omar
(74) *Attorney, Agent, or Firm* — Conley Rose, P.C.; Grant Rodolph; Nicholas K. Beaulieu

(57) ABSTRACT

A charger and a charging system are provided. The charger includes: a rectifier, a transformer, a first diode, a capacitor, a voltage sampling feedback unit, a pulse width modulation (PWM) controller, a battery voltage feedback unit and a semiconductor switching component, where the battery voltage feedback unit is added in the charger to detect battery voltage of a terminal, and the detected battery voltage of the terminal is fed back to a voltage sampling feedback unit inside the charger, so that the voltage sampling feedback unit can adjust an output voltage of the charger in real time according to an actual battery voltage of the terminal, and therefore, the output voltage of the charger gradually rises along with an increase of the battery voltage of the terminal, thereby effectively reducing energy consumption of the charger and achieving a purpose of energy saving.

14 Claims, 5 Drawing Sheets

(51) Int. Cl.
  *H02J 7/16* (2006.01)
  *H02M 3/335* (2006.01)
  *H02J 7/02* (2016.01)
  *H02M 1/00* (2006.01)

(52) U.S. Cl.
  CPC .......... *H02J7/022* (2013.01); *H02J 2007/0059* (2013.01); *H02M 2001/0045* (2013.01); *Y02B 40/90* (2013.01)

(56) References Cited

FOREIGN PATENT DOCUMENTS

| | | | |
|---|---|---|---|
| CN | 102013532 | A | 4/2011 |
| CN | 202206179 | U | 4/2012 |
| CN | 202651863 | U | 1/2013 |
| EP | 0390079 | A2 | 10/1990 |
| JP | 20050176534 | A | 6/2005 |
| JP | 2008187790 | A | 8/2008 |

OTHER PUBLICATIONS

Foreign Communication From a Counterpart Application, European Application No. 13809055.0, Extended European Search Report dated Mar. 2, 2015, 6 pages.
Partial English Translation and Abstract of Chinese Patent Application No. CN202651863U, Sep. 2, 2014, 5 pages.
Partial English Translation and Abstract of Chinese Patent Application No. CN1738148A, Sep. 2, 2014, 18 pages.
Partial English Translation and Abstract of Chinese Patent Application No. CN202206179U, Sep. 2, 2014, 20 pages.
Partial English Translation and Abstract of Chinese Patent Application No. CN101917032A, Nov. 5, 2014, 21 pages.
Foreign Communication From a Counterpart Application, PCT Application No. PCT/CN2013/078261, English Translation of International Search Report dated Aug. 22, 2013, 2 pages.
Foreign Communication From a Counterpart Application, PCT Application No. PCT/CN2013/078261, Written Opinion dated Aug. 22, 2013, 5 pages.

* cited by examiner

CHARGER AND CHARGING SYSTEM

CROSS-REFERENCE TO RELATED APPLICATIONS

This application is a continuation of International Application No. PCT/CN2013/078261, filed on Jun. 28, 2013, which claims priority to Chinese Patent Application No. 201220308669.3, filed on Jun. 28, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates to power electronic technologies, and in particular, to a charger and a charging system.

BACKGROUND

FIG. 1 is a schematic structural diagram of a charger provided by the prior art. As shown in FIG. 1, the charger detects a voltage at two ends of a capacitor C (that is, an output voltage of the charger) by using a voltage sampling feedback unit inside the charger, and then feeds back the detected voltage to a pulse width modulation (PWM) controller after processing by the voltage sampling feedback unit, thereby controlling the output voltage, and maintaining the output voltage of the charger at a voltage (for example, 5 volts (V)) preset by a user. After a terminal is connected to the charger shown in FIG. 1, the terminal may adopt a low drop out regulator (LDO) linear mode or a direct current (DC) switching mode to charge an internal battery of the terminal. In the linear charging mode, during a process of charging the battery of the terminal, a battery voltage of the terminal continuously rises as the charging proceeds. When the battery voltage is at a low level, use of a 5V constant voltage to charge the battery will cause excessive electric energy loss. How to reduce energy consumption of the charger on a basis of improving charging effectiveness is a problem to be solved by persons skilled in the art.

SUMMARY

The present disclosure provides a charger used to reduce energy consumption effectively, where the charger includes: a rectifier, a transformer, a first diode, a capacitor, a voltage sampling feedback unit, a PWM controller, and a semiconductor switching component, where the rectifier is connected to an alternating current power network; one primary end of the transformer is connected to an output end of the rectifier, and the other primary end is connected to the semiconductor switching component; one secondary end of the transformer is connected to an anode of the first diode, and the other secondary end is grounded; one end of the capacitor is connected to a cathode of the first diode, and the other end is grounded; two input ends of the voltage sampling feedback unit are connected in parallel to the capacitor; and a feedback input end of the PWM controller is connected to an output end of the voltage sampling feedback unit, and an output end of the PWM controller is connected to a control end of the semiconductor switching component; and the charger further includes a battery voltage feedback unit, where two input ends of the battery voltage feedback unit are connected to an anode and a cathode of a battery of the terminal respectively, and an output end of the battery voltage feedback unit is connected to the voltage sampling feedback unit.

In the foregoing charger, the voltage sampling feedback unit includes: a photocoupler, composed of a light emitting diode and a phototransistor, where an anode of the light emitting diode is connected to a second end of a first resistor, and a first end of the first resistor is connected to a cathode of the first diode; and a collector of the phototransistor is connected to the input end of the PWM controller and an emitter of the phototransistor is grounded; a voltage divider network, composed of a second resistor and a third resistor, where a first end of the second resistor is connected to the cathode of the first diode, a second end of the second resistor is connected to a first end of the third resistor, and a second end of the third resistor is grounded; and a voltage reference source that provides a voltage reference for the third resistor, where a reference end of the voltage reference source is connected to the first end of the third resistor, a conduction end of the voltage reference source is connected to a cathode of the light emitting diode, and a grounding end of the voltage reference source is grounded; and the battery voltage feedback unit includes a triode, where an emitter and a collector are connected to the first end and the second end of the second resistor respectively, a base is connected to an anode of a third diode, a cathode of the third diode is connected to a first end of a fourth resistor, and a second end of the fourth resistor is connected in series to the anode of the battery of the terminal.

The present disclosure further provides a charging system, where the charging system includes the terminal and the foregoing charger, where the cathode of the first diode in the charger is a voltage output end of the charger, the charger and the battery of the terminal are commonly grounded, and the two input ends of the battery voltage feedback unit are connected to the anode and the cathode of the battery of the terminal respectively.

The technical effects of the present disclosure are that a battery voltage feedback unit is added in a charger to detect battery voltage of a terminal, and the detected battery voltage of the terminal is fed back to a voltage sampling feedback unit inside the charger, so that the voltage sampling feedback unit can adjust an output voltage of the charger in real time according to an actual battery voltage of the terminal, and therefore, the output voltage of the charger gradually rises along with an increase of the battery voltage of the terminal, thereby effectively reducing energy consumption of the charger and achieving a purpose of energy saving.

DETAILED DESCRIPTION

Figure 2:
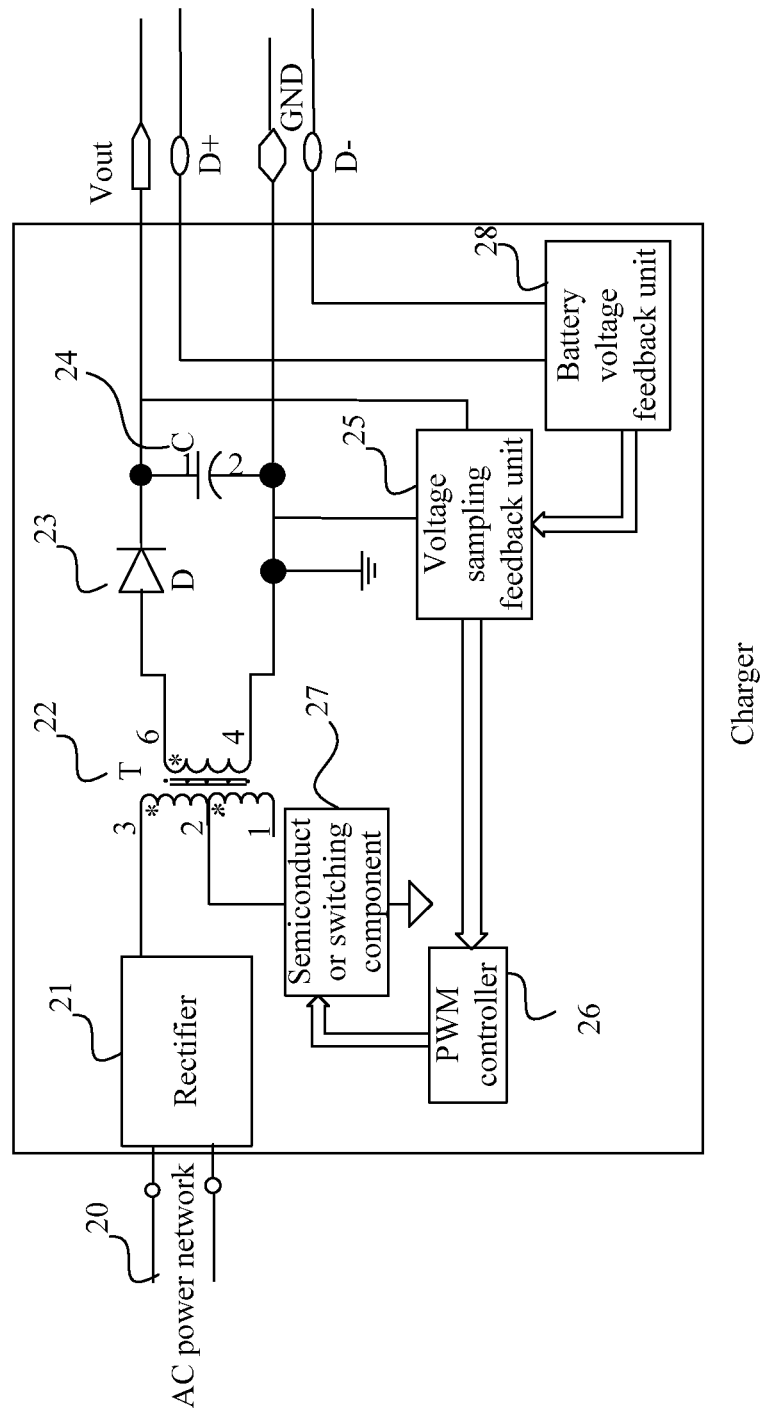
FIG. 2 is a schematic structural diagram of a charger according to an embodiment of the present disclosure.
Figure 3:
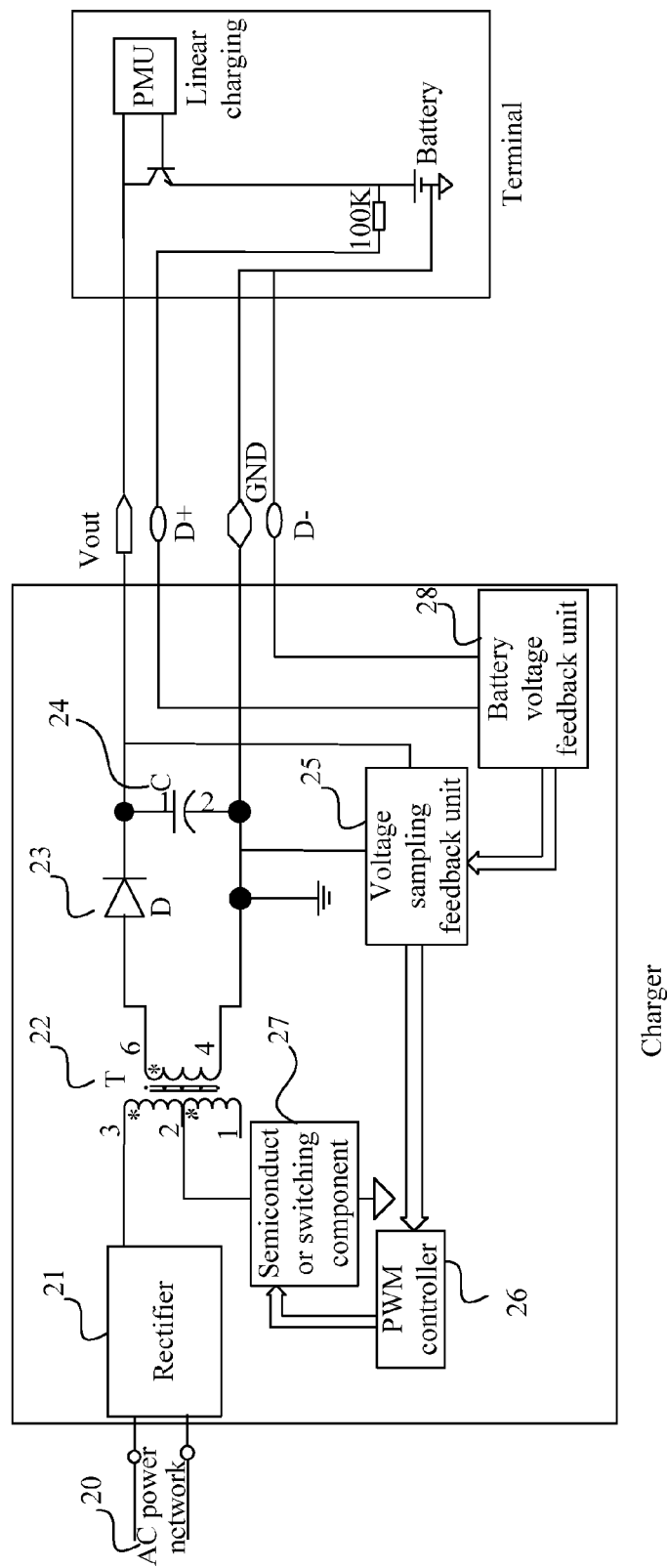
FIG. 3 is a schematic structural diagram of a charging system according to an embodiment of the present disclosure.

FIG. 2 is a schematic structural diagram of a charger according to an embodiment of the present disclosure, and FIG. 3 is a schematic structural diagram of a charging system according to an embodiment of the present disclosure. With reference to content illustrated in FIG. 2 and FIG. 3, a charger according to an embodiment of the present disclosure includes: a rectifier 21, a transformer 22, a first diode 23, a capacitor 24, a voltage sampling feedback unit 25, a PWM controller 26 and a semiconductor switching component 27, where the rectifier 21 is connected to an alternating current (AC) power network; one primary end of the transformer 22 is connected to an output end of the rectifier 21, and the other primary end of the transformer 22 is connected to the semiconductor switching component 27; one secondary end of the transformer 22 is connected to an anode of the first diode 23, and the other secondary end of the transformer 22 is grounded; one end of the capacitor 24 is connected to a cathode of the first diode 23, and the other end of the capacitor 24 is grounded; the voltage sampling feedback unit 25 is connected in parallel to the capacitor 24; and a feedback input end of the PWM controller 26 is connected to an output end of the voltage sampling feedback unit 25, and an output end of the PWM controller 26 is connected to a control end of the semiconductor switching component 27. The charger further includes: a battery voltage feedback unit 28, where two input ends of the battery voltage feedback unit 28 are connected to an anode and a cathode of a battery of a terminal respectively, and an output end of the battery voltage feedback unit 28 is connected to the voltage sampling feedback unit 25.

The cathode of the first diode 23 is a voltage output end of the charger, the charger and the battery of the terminal are commonly grounded, and the two input ends of the battery voltage feedback unit 28 are connected to the anode and the cathode of the battery of the terminal respectively.

Figure 4:
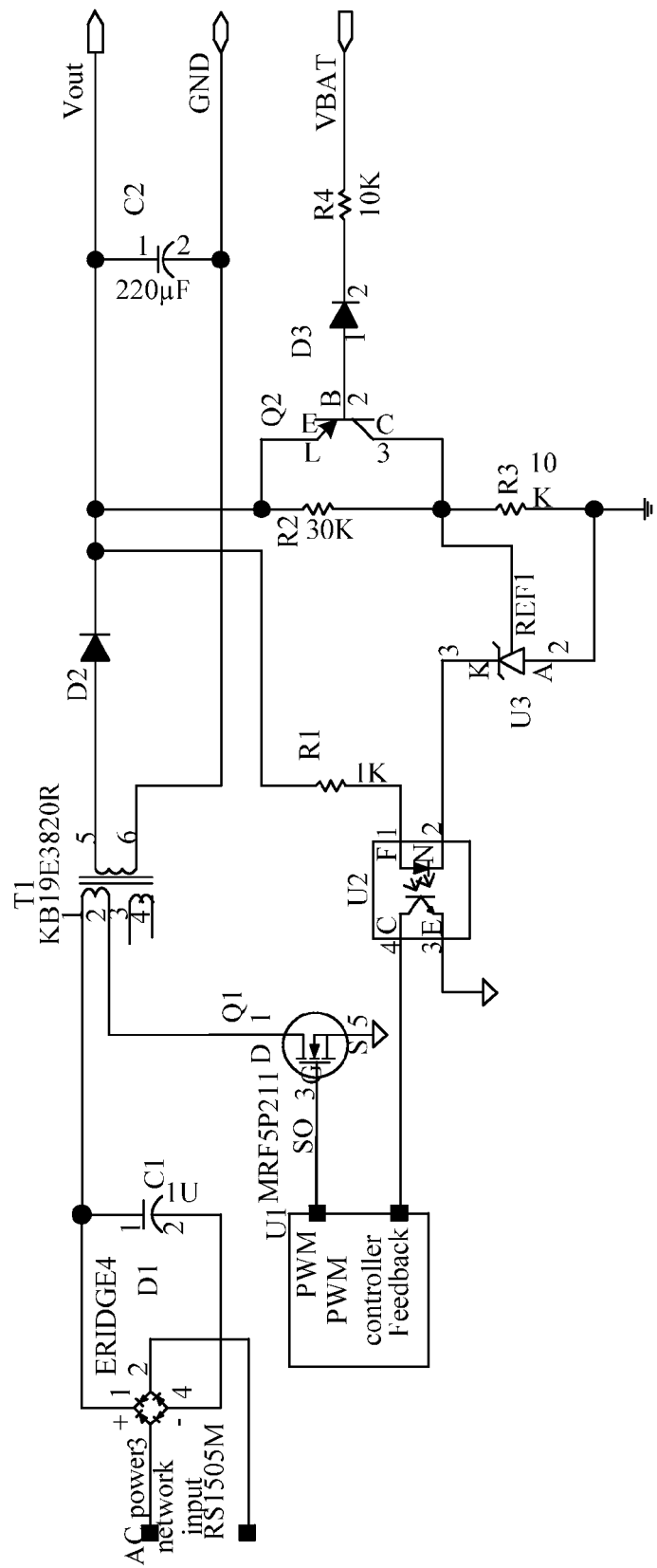
FIG. 4 is a circuit diagram for specific implementation of a charger according to an embodiment of the present disclosure.

It should be noted that the two input ends of the battery voltage feedback unit 28 may be implemented by using an auxiliary cable in a charging cable of the charger, for example, a D+/D− signal cable with a standard universal serial bus (USB) interface. The battery voltage feedback unit 28 may be a control chip or a discrete circuit, which implements measurement of the battery voltage of the terminal. FIG. 4 shows a circuit diagram for specific implementation of a charger according to an embodiment of the present disclosure. A circuit composed of a first resistor R1, a second resistor R2, a third resistor R3, a photocoupler U2, and a voltage reference source U3 is an initial voltage sampling feedback unit 25, and a triode Q2, a third diode D3 and a fourth resistor R4 that are newly added form the battery voltage feedback unit 28. As shown in FIG. 4, the photocoupler U2 is composed of a light emitting diode and a phototransistor.

In the initial voltage sampling feedback unit 25, the R2 and the R3 form an output voltage divider network, and a voltage of the R3 is compared with a reference voltage of the voltage reference source U3. A current passes from an end K to an end A of the voltage reference source only when the voltage of the R3 exceeds the reference voltage of the voltage reference source U3, so that the R1, an end 1 to an end 2 of the photocoupler U2, and the end K to the end A of the voltage reference source U3 form a current path. $V_{ce}$ of the U2 is conducted when the end 1 and the end 2 of the photocoupler U2 is conducted. A fixed output voltage $V_{out}$ is obtained by setting a resistance ratio of the R2 to the R3.

After the Q2, D3 and R4 are added and $V_{bat}$ is connected to an anode of the battery, a feedback current dividing loop is formed when the $V_{out}$ passes through the triode Q2, the diode D3 and the resistor R4, and this current dividing loop is equivalent to connecting a variable resistor (a resistance increases with the increase of the battery voltage) in parallel to the R2. In this way, a ratio of the R2 to the R3 is dynamically adjusted, thereby dynamically adjusting an actual value of the output voltage $V_{out}$. Specifically, when the $V_{out}$ is still greater than the $V_{bat}$, a $V_{be}$ of the Q2 is conducted, and then the $V_{ce}$ is conducted, so that a current passes through the Q2. In this way, a current passing through the R2 is partially shunted by the current dividing loop, and the voltage may be changed. Therefore, a fixed voltage dividing ratio in the voltage sampling feedback unit 25 can be changed, thereby achieving a purpose of dynamically adjusting the output voltage $V_{out}$.

By means of a joint effect of the foregoing the battery voltage feedback unit 28, the voltage sampling feedback unit 25 and the PWM controller 26, dynamic adjustment can be effectively performed for the output voltage of the charger according to an actual battery voltage. In this case, the output voltage of the charger is $V_{out}=V_{bat}+\Delta V$, where $\Delta V$ is a minimum voltage drop on a charging power component (a triode which is on a terminal device side and is connected to a power management unit (PMU) and a battery) when linear charging at a maximum current is maintained. $\Delta V$ is generally less than 0.2 V, and in this solution, $\Delta V$ is controlled to be about 0.5 V. Because the $V_{bat}$ ranges between 3.0 V and 4.2 V, a range of the $V_{out}$ may be between 3.5 V and 4.7 V. The voltage reduces by 0.3 V to 1.5 V, compared with the previous 5 V that was always maintained. In this way, an output power of the charger is significantly reduced while efficient charging of the terminal device is maintained. Therefore, an input power of the charger decreases accordingly, thereby saving electric energy.

Figure 1:
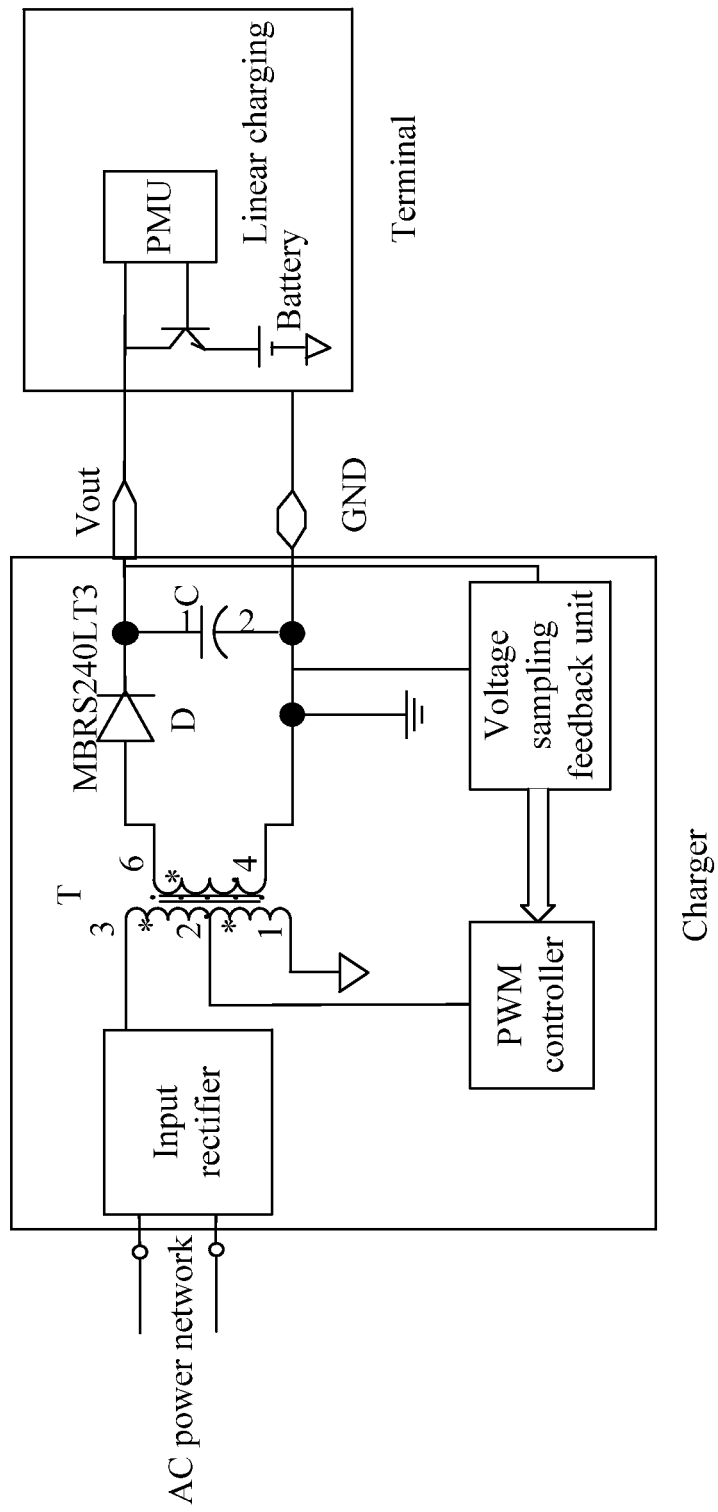
FIG. 1 is a schematic structural diagram of a charger according to the prior art.

Specifically, in the prior art shown in FIG. 1, it is assumed that a terminal with a 1000 milliampere-hour (mAH) built-in battery is charged by using a 5 V/1 ampere (A) charger (AC/DC conversion efficiency is assumed to be 80%), and charging time is 1 hour (H); then, energy consumed by the charger is P=5V*1A/80%*1H=6 watt-hour (WH).

Figure 5:
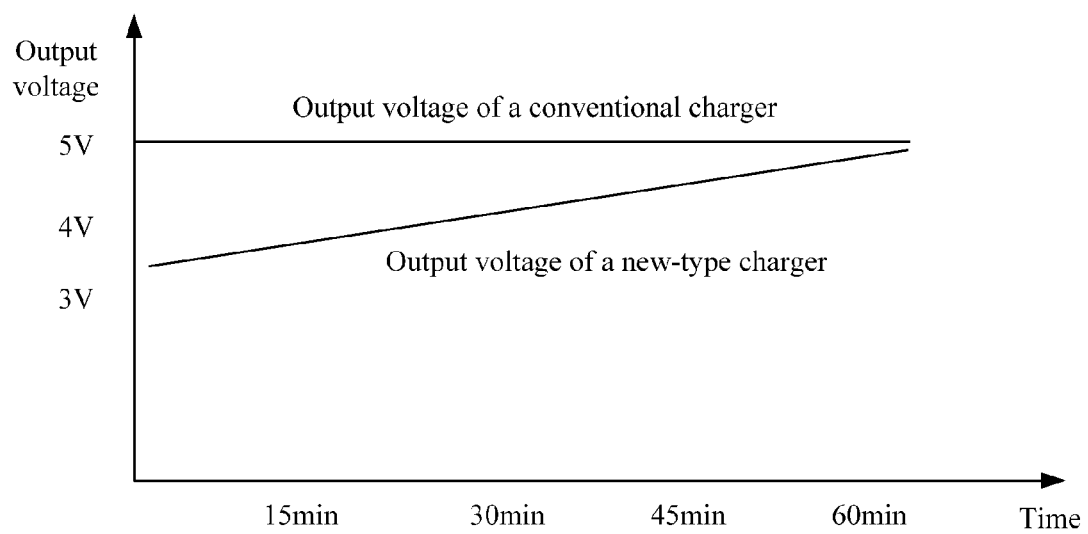
FIG. 5 is a schematic diagram for output voltage comparison between a charger in the prior art and a charger in the present solution.

In the solution provided by the embodiments of the present disclosure, a charger with a 1 A output current is still used, but an output voltage increases gradually with the increase of the battery voltage. In this case, an average output voltage of the charger V=(3.5+4.7)/2=4.1 V. The charging time is still 1H. Then, energy consumed by the charger is P=4.1V*1A/80%*1H=5.1 watts (W), which saves amount of electricity by 15% compared with the original charger. FIG. 5 is a schematic diagram for output voltage comparison between a charger in the prior art and a charger in the present solution.

Currently, there are about 5.9 billion mobile phones in the world. Assuming that 10% of the mobile phones are charged every day in the world, the amount of electricity saved per day is Pt=(6−5.1)*5900000000*10%=530 million WH=530 thousand kilowatt-hour (KWH), which is equivalent to electricity generating power of a large power station.

Further, it should be noted that, if the battery voltage feedback unit 28 does not receive the battery voltage that is fed back, the charger may still perform charging for the terminal according to a constant output voltage that is originally set, for example, 5 V.

In the charger provided by the present disclosure, a battery voltage feedback unit is added in the charger to detect a battery voltage of a terminal and feed back the detected battery voltage of the terminal to a voltage sampling feedback unit, so that the voltage sampling feedback unit can adjust an output voltage of the charger in real time according to the battery voltage of the terminal, and therefore, the output voltage gradually rises along with an increase of the battery voltage of the terminal, thereby effectively reducing energy consumption of the charger.

Finally, it should be noted that the embodiments of the present disclosure are intended for describing the technical solution of the present disclosure rather than limiting the present disclosure. Although the present disclosure is described in detail with reference to the foregoing embodiments, persons of ordinary skill in the art should understand that they may still make modifications to the technical solution described in the foregoing embodiments or make substitutions to partial or whole technical features thereof, without departing from the scope of the technical solution of the embodiments of the present disclosure.

What is claimed is:

1. A charger, comprising:
   a rectifier;
   a transformer coupled to the rectifier;
   a first diode coupled to the transformer;
   a capacitor coupled to the first diode;
   a voltage sampling feedback unit coupled to the capacitor;
   a pulse width modulation (PWM) controller coupled to the voltage sampling feedback unit; and
   a semiconductor switching component coupled to the PWM controller,
   wherein the rectifier is connected to an alternating current power network,
   wherein one primary end of the transformer is connected to an output end of the rectifier, and the other primary end of the transformer is connected to the semiconductor switching component,
   wherein one secondary end of the transformer is connected to an anode of the first diode, and the other secondary end of the transformer is grounded,
   wherein one end of the capacitor is connected to a cathode of the first diode, and the other end of the capacitor is grounded,
   wherein two input ends of the voltage sampling feedback unit are connected in parallel to the capacitor,
   wherein a feedback input end of the PWM controller is connected to an output end of the voltage sampling feedback unit, and an output end of the PWM controller is connected to a control end of the semiconductor switching component,
   wherein the charger further comprises a battery voltage feedback unit,
   wherein two input ends of the battery voltage feedback unit are connected to an anode and a cathode of a battery of the terminal respectively, and an output end of the battery voltage feedback unit is connected to the voltage sampling feedback unit,
   wherein the battery voltage feedback unit comprises a triode, a second diode, and a resistor,
   wherein a base of the triode is connected to an anode of the second diode, a cathode of the second diode is connected to a first end of the resistor, and a second end of the resistor is connected in series to an anode of a battery,
   wherein the voltage sampling feedback unit measures a voltage output of the charger,
   wherein the battery voltage feedback unit measures a voltage of the battery,
   wherein the PWM controller, the voltage sampling feedback unit, and the battery voltage feedback unit dynamically control the voltage output of the charger such that the voltage output of the charger increases according to an equation:

$$V_{out} = V_{bat} + \Delta V,$$ and wherein $V_{out}$ is the voltage output of the charger, $V_{bat}$ is the voltage of the battery, and $\Delta V$ is a minimum voltage drop on a charging power component.

2. The charger according to claim 1, wherein the voltage sampling feedback unit comprises:
   a photocoupler composed of a light emitting diode and a phototransistor, wherein an anode of the light emitting diode is connected to a second end of the first resistor, and a first end of the first resistor is connected to the cathode of the first diode, and wherein a collector of the phototransistor is connected to the input end of the PWM controller and an emitter of the phototransistor is grounded;
   a voltage divider network composed of a second resistor and a third resistor, wherein a first end of the second resistor is connected to the cathode of the first diode, a second end of the second resistor is connected to a first end of the third resistor, and a second end of the third resistor is grounded; and
   a voltage reference source that provides a voltage reference for the third resistor, wherein a reference end of the voltage reference source is connected to the first end of the third resistor, a conduction end of the voltage reference source is connected to a cathode of the light emitting diode, and a grounding end of the voltage reference source is grounded.

3. A charging system, comprising:
   a terminal; and
   a charger,
   wherein the charger comprises:
      a rectifier;
      a transformer coupled to the rectifier;
      a first diode coupled to the transformer;
      a capacitor coupled to the first diode;
      a voltage sampling feedback unit coupled to the capacitor;
      a pulse width modulation (PWM) controller coupled to the voltage sampling feedback unit; and
      a semiconductor switching component coupled to the PWM controller,
      wherein the rectifier is connected to an alternating current power network,
      wherein one primary end of the transformer is connected to an output end of the rectifier, and the other primary end of the transformer is connected to the semiconductor switching component,
      wherein one secondary end of the transformer is connected to an anode of the first diode, and the other secondary end of the transformer is grounded,
      wherein one end of the capacitor is connected to a cathode of the first diode, and the other end of the capacitor is grounded,
      wherein two input ends of the voltage sampling feedback unit are connected in parallel to the capacitor,
      wherein a feedback input end of the PWM controller is connected to an output end of the voltage sampling feedback unit, and an output end of the PWM controller is connected to a control end of the semiconductor switching component,
      wherein the charger further comprises a battery voltage feedback unit,
      wherein two input ends of the battery voltage feedback unit are connected to an anode and a cathode of a battery of the terminal respectively, and an output end of the battery voltage feedback unit is connected to the voltage sampling feedback unit, wherein the cathode of the first diode in the charger is a voltage output end of the charger, the charger and the battery of the terminal are commonly grounded, and two input ends of the battery voltage feedback unit are connected to the anode and the cathode of the battery of the terminal respectively, wherein the battery voltage feedback unit comprises a triode, a second diode, and a resistor, wherein a base of the triode is connected to an anode of the second diode, a cathode of the second diode is connected to a first end of the resistor, and a second end of the resistor is connected in series to an anode of a battery, wherein the voltage sampling feedback unit measures a voltage output of the charger, wherein the battery voltage feedback unit measures a voltage of the battery, wherein the PWM controller, the voltage sampling feedback unit, and the battery voltage feedback unit dynamically control the voltage output of the charger such that the voltage output of the charger increases according to an equation:

$V_{out} = V_{bat} + \Delta V$, and wherein $V_{out}$ is the voltage output of the charger, $V_{bat}$ is the voltage of the battery, and $\Delta V$ is a minimum voltage drop on a charging power component.

4. The charger according to claim 1, wherein the charging power component comprises a triode which is on a terminal device side and is connected to a power management unit.

5. The charger according to claim 1, wherein the two input ends of the battery voltage feedback unit are connected to the anode and the cathode of the battery of the terminal comprises the two input ends of the battery voltage feedback unit being connected through a D+/D− signal cable of a universal serial bus interface.

6. The charger according to claim 1, wherein $V_{out}$ is between 3.5 volts (V) and 4.7 V, wherein $V_{bat}$ is between 3.0 V and 4.2 V, and wherein $\Delta V$ is less than 0.2 V.

7. The charger according to claim 1 wherein $\Delta V$ is controlled to be 0.5 volts (V).

8. The charger according to claim 1, wherein the charging power component comprises a triode which is on a terminal device side and is connected to a power management unit, wherein the two input ends of the battery voltage feedback unit are connected to the anode and the cathode of the battery of the terminal comprises the two input ends of the battery voltage feedback unit being connected through a D+/D− signal cable of a universal serial bus interface, wherein $V_{out}$ is between 3.5 volts (V) and 4.7 V, wherein $V_{bat}$ is between 3.0 V and 4.2 V, and wherein $\Delta V$ is less than 0.2 V.

9. The charger according to claim 2, wherein the charging power component comprises a triode which is on a terminal device side and is connected to a power management unit, wherein the two input ends of the battery voltage feedback unit are connected to the anode and the cathode of the battery of the terminal comprises the two input ends of the battery voltage feedback unit being connected through a D+/D− signal cable of a universal serial bus interface, wherein $V_{out}$ is between 3.5 volts (V) and 4.7 V, wherein $V_{bat}$ is between 3.0 V and 4.2 V, and wherein $\Delta V$ is less than 0.2 V.

10. The charging system according to claim 3, wherein the charging power component comprises a triode which is on a terminal device side and is connected to a power management unit.

11. The charging system according to claim 3, wherein the two input ends of the battery voltage feedback unit are connected to the ode and the cathode of the battery of the terminal comprises the two input ends of the battery voltage feedback unit being connected through a D+/D− signal cable of a universal serial bus interface.

12. The charging system according to claim 3, wherein $V_{out}$ is between 3.5 volts (V) and 4.7 V, wherein $V_{bat}$ is between 3.0 V and 4.2 V, and wherein $\Delta V$ is less than 0.2 V.

13. The charging system according to claim 3, wherein $\Delta V$ is controlled to be 0.5 volts (V).

14. The charging system according to claim 3, wherein the charging power component comprises a triode which is on a terminal device side and is connected to a power management unit, wherein the two input ends of the battery voltage feedback unit are connected to the anode and the cathode of the battery f the terminal comprises the two input ends of the battery voltage feedback unit being connected through a D+/D− signal cable of a universal serial bus interface, wherein $V_{out}$ is between 3.5 volts (V) and 4.7 V, wherein $V_{bat}$ is between 3.0 V and 4.2 V, and wherein $\Delta V$ is less than 0.2 V.

\* \* \* \* \*